W. W. HOOVER.
ANIMAL TRAP.
APPLICATION FILED NOV. 21, 1912.
1,065,130.
Patented June 17, 1913.
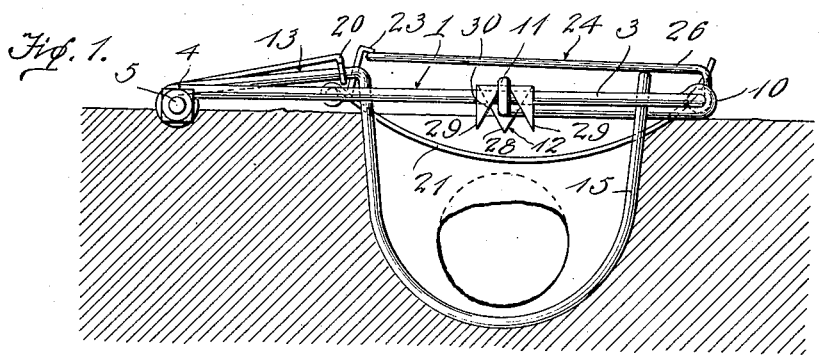
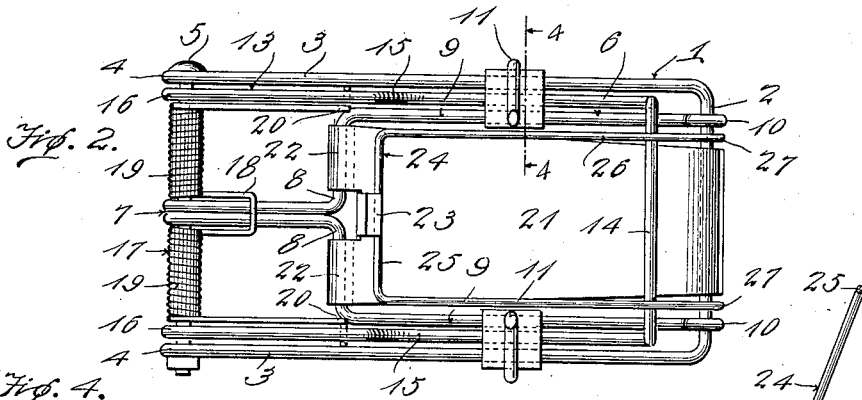
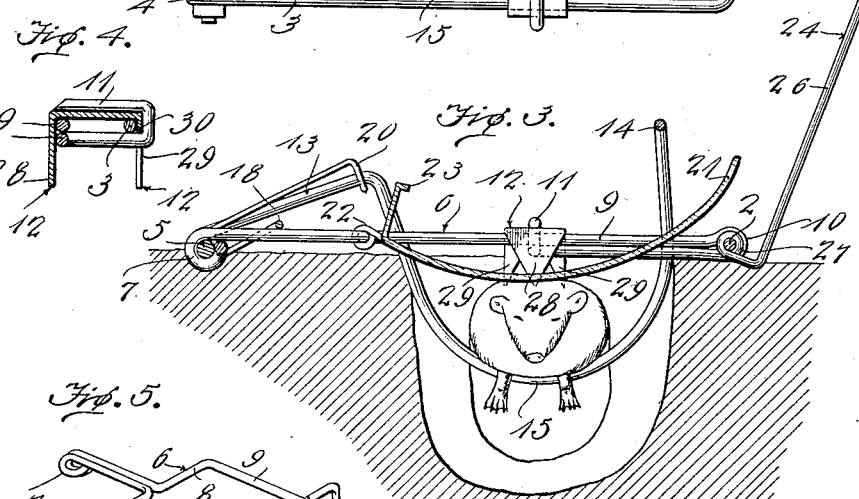
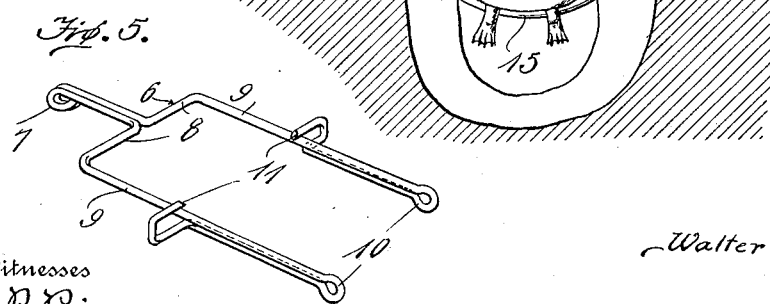
Witnesses
J. R. Pierce
C. E. Hunt
Inventor
Walter W. Hoover
By H. B. Willson & Co.
Attorneys

UNITED STATES PATENT OFFICE.

WALTER W. HOOVER, OF LIBERAL, KANSAS.

ANIMAL-TRAP.

1,065,130. Specification of Letters Patent. Patented June 17, 1913.

Application filed November 21, 1912. Serial No. 732,725.

*To all whom it may concern:*

Be it known that I, WALTER W. HOOVER, a citizen of the United States, residing at Liberal, in the county of Seward and State of Kansas, have invented certain new and useful Improvements in Animal-Traps; and I do declare the following to be a full, clear, and exact description of the invention, such as will enable others skilled in the art to which it appertains to make and use the same.

This invention relates to improvements in animal traps and particularly to traps for catching animals that burrow and travel in underground runways.

One object of the invention is to provide a trap of this character adapted to be set in position for catching an animal without exposing any part of the trap in the runway and which will be readily sprung by the animal passing therethrough.

Another object is to provide a trap of this character which will be simple, strong, durable and inexpensive in construction, efficient and reliable in operation and which when sprung by the animal will effectually hold and quickly kill the latter.

With these and other objects in view, the invention consists of certain novel features of construction, and the combination and arrangement of parts as will be more fully described and claimed.

In the accompanying drawings: Figure 1 is a side view of the trap showing the same set and arranged in position over and around a runway; Fig. 2 is a plan view of the trap with the parts as shown in Fig. 1; Fig. 3 is a central longitudinal section of the trap showing the same sprung and an animal caught therein; Fig. 4 is a detail sectional view through one side of the trap taken on the line 4—4 of Fig. 2 showing more particularly the construction and arrangement of the teeth or barbs which impale the animal when caught; Fig. 5 is a detail perspective view of the inner frame or treadle supporting member of the trap.

My improved trap comprises a main rectangular supporting frame 1 which is formed from a single wire rod bent intermediate its ends to form the front bar 2 of the frame and having its ends extending rearwardly in parallel relation to form the side bars 3 of the frame. The rear or free ends of the side bars 3 are bent to form eyes 4 which are engaged with a bolt 5 which forms the rear end of the frame 1.

Within the frame 1 is an inner treadle supporting frame 6 which is also formed from a single wire rod bent upon itself midway between its ends and having its loop end bent to form an eye 7 by means of which this end of the frame is attached to the bolt 5. The ends of the rod are bent outwardly in opposite directions and at right angles a suitable distance from the eye 7 to form treadle supporting arms 8. After forming the arms 8 the ends of the rod are bent forwardly in parallel relation to the side bars 3 of the main frame 1 and form the side bars 9 of the inner or treadle supporting frame, said side bars 9 extending to the front cross bar 2 of the frame 1 around which the ends of the wire forming said side bars 9 are bent and pressed together as at 10 thereby securing the forward ends of the side bars 9 to the front bar 2 of the main frame, said bar thus also forming the front bar of the treadle frame 6. The ends of the wire after being bent around the cross bar 2 are extended back beneath the side bars 9 of the treadle frame to a point substantially midway between the outer ends of said bars and the treadle supporting arms at which point the ends of the wire are bent outwardly at right angles and thence upwardly and inwardly around the side bars 3 of the main frame to form teeth or barb gripping clips 11 by means of which the impaling teeth or barbs 12 of the trap are secured in position for impaling the body of the animal when caught.

Pivotally connected at its rear end to the bolt 5 is a spring actuated choking jaw 13 which is also preferably formed from a single wire rod bent intermediate its ends to form a cross bar 14 at the ends of which the rods are bent downwardly and rearwardly to form choking loops 15. At the inner ends of the loops 15 the ends of rod are bent back in parallel relation and have their extremities bent to form eyes 16 by means of which the jaw is pivotally attached to the bolt 5. When thus constructed the loops 15 or sides of the jaw are adapted to work between the side bars 3 of the main frame and the side bars 9 of the treadle supporting frame 8, said side bars 3 and 9 co-acting with the loops 15 on the jaw to choke and quickly kill the animal when caught. The jaw 13 is actuated when the trap is sprung by a spring 17 which is bent midway between its ends to form a loop 18 which is engaged with the rear ends of the wire forming the treadle supporting frame 6. After forming the loop 18 the ends of the spring wire are bent to form coils 19 which are engaged with the bolt 5 on the opposite sides of the eye 7 of the treadle frame. The ends of the spring wire after forming the coil are extended forwardly alongside the rear ends of the jaw and have their extremities bent to form hooks 20 which are engaged with the side bars of the jaw adjacent to the rear sides of the loops 15 whereby the power of the spring will be applied to swing the jaw upwardly when released thereby catching the animal between the loops 15 of the jaw and the side bars 3 and 9 of the outer and inner frame of the trap.

Pivotally secured at its inner end to the treadle supporting arms 8 of the treadle frame is a jaw holding and releasing treadle 21 comprising a downwardly curved plate which preferably tapers slightly from its rear toward its front end and which has its inner end cut and bent to form pivot loops or eyes 22 and an upwardly projecting detent or catch lug 23 with which is adapted to be engaged a jaw holding trigger 24. The loops 22 of the trigger are pivotally engaged with the treadle supporting arms 8 of the treadle frame 6, while the downwardly curved body portion of the treadle projects downwardly between the side bars of the treadle frame and has its forward end engaged with the front cross bar 2 of the main frame as clearly shown in Fig. 1 of the drawing.

The trigger 24 comprises a substantially rectangular frame formed from a single rod or wire bent intermediate its ends to form a transverse detent engaging bar 25 and side bars 26 the ends of which are bent as at 27 whereby the trigger is loosely connected to the front cross bar 2 of the main frame 1 as shown.

The teeth or barbs 12 of the trap are preferably formed from bail shaped metal plates which are engaged with the side bars 3 and 9 of the outer and inner frames of the trap and secured in position by the clips 11 as hereinbefore described. The inner ends of the plates are cut to form single V-shaped barbs or points 28 while the outer ends of the plates are cut to form two V-shaped barbs or points 29 between which is formed a notch 30 with which the fastening clips 11 of the teeth are engaged.

In setting the trap the jaw 13 is forced downwardly between the side bars of the inner and outer frames until the cross bar 14 connecting the outer ends of the loops 15 of the jaw is brought into engagement with the side bars 9 of the treadle frame after which the trigger frame is swung over into engagement with the cross bar 14 of the jaw and has its cross bar 25 engaged with the detent or catch 23 on the inner end of the treadle, the trigger thus holding the loops of the jaw in position for catching the animal when the trap is sprung. When the trigger is engaged with the detent 23 on the treadle the latter will project downwardly between the loops in position to be engaged by the animal passing beneath the same and through the loops. When the treadle is thus engaged and lifted by the animal the detent 23 will be disengaged from the trigger thereby releasing the latter and permitting the spring 17 to forcibly swing the jaw 13 upwardly thereby catching the animal between the loops and the side bars of the frames of the trap and impaling the animal on the teeth or barbs 12.

In placing the trap in position the loops 15 of the jaw are forced downwardly into the ground around the runway after which the upper surface of the ground is pushed inwardly to a sufficient extent for forming a depression to receive the downwardly curved treadle. In thus depressing the ground the runway will be partially closed so that when the animal passes through the runway the depressed earth will be forced upwardly thus lifting the treadle and springing the trap in the manner described.

In arranging the trap as herein shown and described it will be seen that no part of the trap is disposed in the runway and that the animal does not come into direct contact with any part of the trap until the latter is sprung and the animal caught.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:—

In a trap of the character described, a main frame having parallel side bars, a treadle frame secured in said main frame and having side bars spaced from and disposed in parallel relation to said side bars of the main frame, impaling teeth comprising bail-shaped plates engaged with and spanning the side bars of said main and treadle supporting frames and having depending V-shaped points, clips formed on the ends of said treadle frame and adapted to fasten said impaling teeth in engagement with the side bars of said main and treadle frames, a choking jaw adapted to work between the parallel side bars of said main and treadle frames and to co-act therewith and with said impaling teeth, a treadle pivoted in said treadle frame, and a trigger engaged with said treadle and adapted to hold said jaw in a set position.

In testimony whereof I have hereunto set my hand in presence of two subscribing witnesses.

WALTER W. HOOVER.

Witnesses:
LOTTIE FINLEY,
E. S. IRWIN.